(12) United States Patent
Villaire et al.

(10) Patent No.: US 10,336,184 B2
(45) Date of Patent: Jul. 2, 2019

(54) FUEL STORAGE ASSEMBLY

(71) Applicant: GM Global Technology Operations LLC, Detroit, MI (US)

(72) Inventors: William L. Villaire, Clarkston, MI (US); Edward J. Strzelecki, Oxford, MI (US); Kristin M. DeMare, Scottsdale, AZ (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/676,052

(22) Filed: Aug. 14, 2017

(65) Prior Publication Data

US 2019/0047408 A1 Feb. 14, 2019

(51) Int. Cl.
*B60K 15/03* (2006.01)
*B60K 15/06* (2006.01)
*F02M 37/14* (2006.01)

(52) U.S. Cl.
CPC .. *B60K 15/061* (2013.01); *B60K 2015/03131* (2013.01); *B60K 2015/03138* (2013.01); *B60K 2015/03217* (2013.01); *B60K 2015/03368* (2013.01); *F02M 37/14* (2013.01); *Y10T 137/86043* (2015.04); *Y10T 137/86163* (2015.04)

(58) Field of Classification Search
CPC ........ B60K 15/061; B60K 2015/03131; B60K 2015/03138; B60K 2015/03217; B60K 2015/03368; F04F 10/00; F02M 37/14; F02M 37/00; F02M 37/10; F02M 37/106; F02M 37/103; F02M 33/02; G01F 23/26; Y10T 137/86163; Y10T 137/86043; Y10T 137/86075; Y10T 137/86091; Y10T 137/86067; Y10T 137/86035; Y10T 137/2842; Y10T 137/2877
USPC .... 137/386, 565.17, 565.22, 565.24, 565.33, 137/565.34, 565.37, 142, 147; 123/514, 123/516; 340/618, 623, 625; 73/307, 73/308, 311, 317, 322.5; 200/84 R–84 C
See application file for complete search history.

(56) References Cited

U.S. PATENT DOCUMENTS

| | | | | |
|---|---|---|---|---|
| 3,685,357 A | * | 8/1972 | Alexander | G01F 23/70 200/84 C |
| 4,532,491 A | * | 7/1985 | Rau | G01F 23/36 338/33 |
| 6,679,227 B2 | * | 1/2004 | Sawert | F02M 37/106 123/198 D |
| 6,792,966 B2 | * | 9/2004 | Harvey | F02M 37/0047 123/514 |

(Continued)

*Primary Examiner* — Craig J Price
(74) *Attorney, Agent, or Firm* — Cantor Colburn LLP

(57) ABSTRACT

A fuel storage assembly includes a power source, a first tank, a fuel pump, an electric relay, a second tank, and a shut-off device. The fuel pump is adapted to remove fuel from the first tank. The electric relay is electrically connected between the power source and the fuel pump for terminating electric power to the fuel pump. The second tank is adapted to receive the fuel removed from the first tank. The shut-off device is located in the second tank and is electrically connected to the electric relay, and is configured to detect a shut-off level of fuel in the second tank. Upon detection of the shut-off level, the shut-off device effects shut-down of the fuel pump via the electric relay.

15 Claims, 2 Drawing Sheets

(56) References Cited

U.S. PATENT DOCUMENTS

| | | | | |
|---|---|---|---|---|
| 6,802,301 | B2* | 10/2004 | Fauser | F02M 37/10 123/198 D |
| 6,808,087 | B1* | 10/2004 | Ford | B67D 7/3218 222/144.5 |
| 6,810,908 | B2* | 11/2004 | Eck | B60K 15/077 123/509 |
| 6,840,230 | B2* | 1/2005 | Ichikawa | B01D 35/0273 123/509 |
| 6,843,235 | B2* | 1/2005 | Mashimo | F02M 37/08 123/198 D |
| 6,851,315 | B2* | 2/2005 | Bergsma | G01F 23/363 73/290 R |
| 6,854,479 | B2* | 2/2005 | Harwood | E02D 31/02 137/362 |
| 6,868,724 | B2* | 3/2005 | Brzozowski | G01F 23/38 73/290 R |
| 7,007,675 | B2* | 3/2006 | Ida | F02M 37/0017 123/468 |
| 7,017,557 | B2* | 3/2006 | Rumpf | B60K 15/077 123/509 |
| 7,047,948 | B2* | 5/2006 | Gerhardt | B60K 15/03504 123/516 |
| 7,047,949 | B2* | 5/2006 | Reiter | B60K 15/035 123/516 |
| 7,066,153 | B2* | 6/2006 | Vitalis | F02M 37/0094 123/509 |
| 7,069,913 | B1* | 7/2006 | Crary | F02M 37/0052 123/509 |
| 7,119,699 | B2* | 10/2006 | King | G08B 21/20 340/618 |
| 7,458,260 | B2* | 12/2008 | Roesner | G01F 23/2845 73/290 V |
| 7,506,636 | B2* | 3/2009 | Lubinski | F02M 37/0058 123/509 |
| 7,617,725 | B2* | 11/2009 | Howayshell | G01F 23/60 73/308 |
| 7,714,732 | B2* | 5/2010 | Cox | G01F 23/0038 250/901 |
| 7,950,372 | B2* | 5/2011 | Powell | F02D 41/3082 123/510 |
| 8,051,840 | B2* | 11/2011 | Cushing | F02M 37/223 123/196 A |
| 8,226,123 | B2* | 7/2012 | Chino | B60K 15/03519 137/142 |
| 8,316,885 | B2* | 11/2012 | Bauer | F23K 5/04 123/509 |
| 8,360,033 | B2* | 1/2013 | Park | F02M 37/0082 123/509 |
| 8,579,332 | B2* | 11/2013 | Sonderegger | B60K 15/03 123/514 |
| 8,672,651 | B2* | 3/2014 | Pae | F04B 17/03 123/497 |
| 8,689,827 | B2* | 4/2014 | Okazono | F02M 37/0017 123/509 |
| 8,720,485 | B2* | 5/2014 | Mason | F04F 5/10 123/514 |
| 8,985,964 | B2* | 3/2015 | Noel | F04B 49/025 116/110 |
| 9,217,403 | B1* | 12/2015 | Cotton | G01F 23/30 |
| 9,362,072 | B2* | 6/2016 | Davis | H01H 35/186 |
| 9,364,911 | B2* | 6/2016 | Yoshizaki | B23H 1/10 |
| 9,976,524 | B2* | 5/2018 | Takaoka | F02M 37/0088 |

* cited by examiner

FUEL STORAGE ASSEMBLY

INTRODUCTION

The subject disclosure relates to a fuel storage assembly, and more particularly, to fuel transfer capability between first and second tanks of the fuel storage assembly.

Fuel storage assemblies, such as those used for vehicles, may include a primary fuel tank, a secondary fuel tank, and a fuel transfer system. The fuel transfer system is adapted to transfer fuel from the secondary fuel tank to the primary fuel tank on an as needed basis. Further enhancements of back-up, or fail safe, fuel transfer systems designed to prevent over filling of the primary fuel tank during a fuel transfer process are desirable.

SUMMARY

A fuel storage assembly according to one, non-limiting, embodiment of the present disclosure includes a power source, a first tank, a fuel pump, an electric relay, a second tank, and a shut-off device. The fuel pump is adapted to remove fuel from the first tank. The electric relay is electrically connected between the power source and the fuel pump for terminating electric power to the fuel pump. The second tank is adapted to receive the fuel removed from the first tank. The shut-off device is located in the second tank and is electrically connected to the electric relay, and is configured to detect a shut-off level of fuel in the second tank. Upon detection of the shut-off level, the shut-off device effects shut-down of the fuel pump via the electric relay.

Additionally to the foregoing embodiment, the fuel storage assembly includes a fuel pump module including a second fuel pump adapted to remove fuel from the second tank, and a fuel level sensor configured to measure fuel level within the second tank and effect shut-down of the first fuel pump module upon detection of a deactivate transfer level that is lower than the shut-off level.

In the alternative or additionally thereto, in the foregoing embodiment, the shut-off level is lower than a manually filled level.

In the alternative or additionally thereto, in the foregoing embodiment, the fuel storage assembly includes a controller configured to receive signals from the fuel level sensor, monitor fuel levels in the second tank, and command shut-down of the first fuel pump when the deactivate transfer level is reached.

In the alternative or additionally thereto, in the foregoing embodiment, the fuel storage assembly includes a warning indicator electrically connected to the controller, and configured to initiate upon detection of the shut-off level.

In the alternative or additionally thereto, in the foregoing embodiment, the shut-off level is higher than a manually filled level.

In the alternative or additionally thereto, in the foregoing embodiment, the electric relay is normally closed and opened by the shut-off device when the shut-off level is reached.

In the alternative or additionally thereto, in the foregoing embodiment, the electric relay is normally closed and opened by the shut-off device when the shut-off level is reached.

In the alternative or additionally thereto, in the foregoing embodiment, the shut-off device includes a thermistor for detecting fuel level.

In the alternative or additionally thereto, in the foregoing embodiment, the shut-off device includes a reed switch.

In the alternative or additionally thereto, in the foregoing embodiment, the shut-off device includes a fuel level sensor and a shield adapted to limit the fuel level sensor from liquid fuel exposure.

In the alternative or additionally thereto, in the foregoing embodiment, the shield defines a vapor dome and the fuel level sensor is located in the vapor dome.

In the alternative or additionally thereto, in the foregoing embodiment, wherein the shut-off device is disposed below a manually filled level.

In the alternative or additionally thereto, in the foregoing embodiment, the shut-off device is attached and supported by the fuel pump module.

In the alternative or additionally thereto, in the foregoing embodiment, the fuel storage assembly is a vehicle fuel storage assembly.

A vehicle fuel storage assembly according to another, non-limiting, embodiment includes a secondary fuel tank, a primary fuel tank, a secondary fuel pump, a primary fuel pump, a primary fuel level sensor, a shut-off fuel level sensor, and a controller. The secondary fuel pump is adapted to pump fuel from the secondary fuel tank to the primary fuel tank. The primary fuel pump is adapted to expel fuel from the primary fuel tank. The primary fuel level sensor is adapted to measure fuel level in the primary fuel tank. The shut-off fuel level sensor is located in the primary fuel tank, and is adapted to effect shutdown of the secondary fuel pump during an excessive fuel transfer condition. The controller is configured to receive fuel level signals from the primary fuel level sensor, and command activation and deactivation of the secondary fuel pump as dictated by preprogrammed level thresholds.

Additionally to the foregoing embodiment, the fuel storage assembly includes an electric relay in electric communication with the shut-off fuel level sensor, wherein the electric relay is configured to open when the shut-off fuel level sensor detects a shut-off fuel level in the primary fuel tank, and thereby effect shutdown of the secondary fuel pump.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
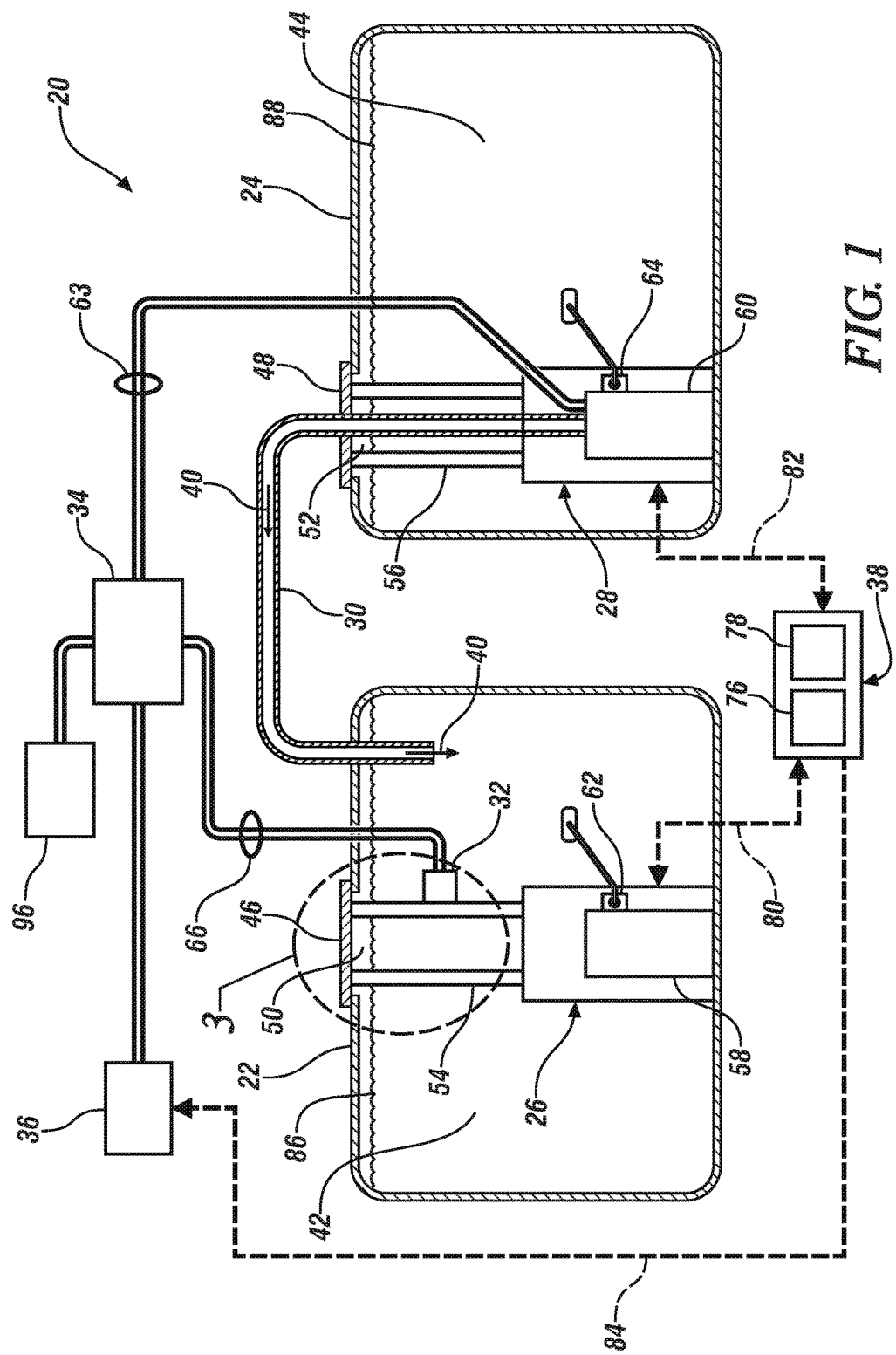
FIG. 1 is a cross section of a fuel storage assembly.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 illustrates a fuel storage assembly 20 that may provide fuel for a combustion engine of a vehicle. The fuel storage assembly 20 may include fuel tanks 22, 24, fuel pump modules 26, 28, a fuel transfer conduit 30, a shut-off device 32, a relay (i.e., or equivalent circuitry) 34, a power source 36, and a controller 38. The fuel tank 22 may be a primary fuel tank generally used to provide fuel directly to the combustion engine. The fuel tank 24 may be a secondary fuel tank that may generally supply fuel to the primary fuel tank 22 when needed. The fuel pump module 28 may be adapted to deliver fuel (i.e., see arrow 40) through the transfer conduit 30 and into the primary fuel tank 22 when fuel levels in the primary fuel tank dictate a need for fuel. It is understood and contemplated that the secondary and primary fuel tanks 24, 22 may, alternatively, be equivalent tanks (i.e., respective first and second tanks), which may be designed to deliver fuel in either direction between the two tanks.

Each fuel tank 22, 24 may include boundaries that define respective chambers 42, 44 that contain the fuel 40. The transfer conduit 30 extends between, and is in fluid communication with the chambers 42, 44. The fuel 40 is stored in the chambers 42, 44, and the fuel pump modules 26, 28 may be located in the respective chambers 42, 44.

Each fuel pump module 26, 28 may be suspended from respective flanges 46, 48 that are engaged to upper portions of the respective tanks 22, 24. The flanges 46, 48 may cover tank openings 50, 52 large enough to insert the modules 26, 28 there-through for assembly and maintenance purposes. The fuel pump modules 26, 28 may further include respective support structures 54, 56 that may extend substantially vertically between, and are engaged to, the respective flanges 46, 48. It is further contemplated and understood that the fuel pump modules 26, 28 may be bottom referenced.

Each fuel pump module 26, 28 may include the respective support structures 54, 56, respective fuel pumps 58, 60, respective fuel level sensors 62, 64, and other components (not shown) that may include filters, pressure regulators, various sensors, fuel reservoirs. The structures 54, 56 may be, or may include, vertical rods (i.e., two illustrated for each module) connected to, and extending between the respective flanges 46, 48 and the respective pumps 58, 60. The rods 54, 56 are of sufficient length to generally locate the pump inlets, or fuel reservoirs associated with the pump inlets, toward the bottom of the respective tanks 22, 24.

The relay 34 may be adapted to open and close a power circuit 63 (i.e., power conductors) extending from the power source 36 to the fuel pump module 28 in the secondary fuel tank 24. The relay 34 may be normally closed, and generally controlled by the shut-off device 32 over electrical conductors 66. The shut-off device 32 may be located in the chamber 42 defined by the fuel tank 22. The support structure 54 of the fuel pump module 26 may be attached to, and thus supports, the shut-off device 32. That is, the shut-off device 32 may be part of the fuel pump module 26 to optimize packaging and for ease of design and maintenance.

Figure 2:
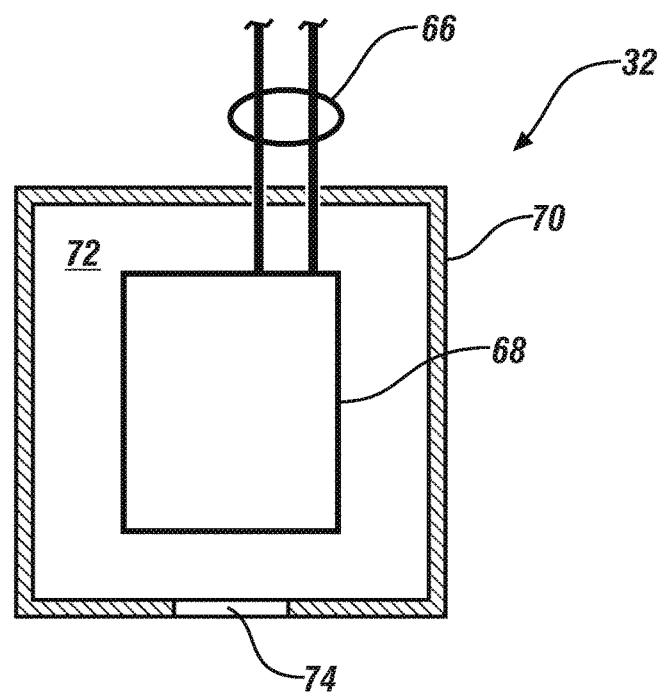
FIG. 2 is a cross section of a shut-off device of the fuel storage assembly.

Referring to FIGS. 1 and 2, the shut-off device 32 is adapted to prevent an excessive fuel transfer condition from the secondary fuel tank 24 to the primary fuel tank 22, and may include a fuel level sensor 68 and a fuel shield 70 for protecting the shut-off device 32 from excessive liquid fuel exposure (i.e., fuel slosh). The shield 70 may be a baffle, a deflector, an inverted cup, or other structure having boundaries that define, and are capable of maintaining, a vapor dome 72 with the level sensor 68 being in the vapor dome 72. The shield 70 may include a bottom opening 74 for the eventual drainage of any fuel 40 that may enter the vapor dome 72. Examples of the fuel level sensors 62, 64, 68 may include one or more micro-switches with a float, one or more reed switches with a magnetic float, and others. Further examples of the fuel level sensor 68 may include thermistor (i.e., fluid contact), a proximity switch, and others.

The controller 38 may include a processor 76 (e.g., microprocessor) and an electronic storage medium 78 that may be computer writeable and readable. The processor 76 may be configured to receive fuel level signals (see arrows 80, 82 in FIG. 1) from the respective fuel level sensors 62, 64 of the respective fuel pump modules 26, 28, process the signals 80, 82, and output informative signals to appropriate fuel level indicators (not shown). The processor 76 may be further configured to perform variety of other functions and diagnostics including the control of the fuel pumps 58, 60, at least in-part, via the control (see arrow 84) of the power source 36 during normal operations. It is understood and contemplated that the control of the fuel pump modules 26, 28 by the controller 38 may be, at least in-part, controlled at the power source 36, itself, or at the modules 26, 28, or both.

Figure 3:
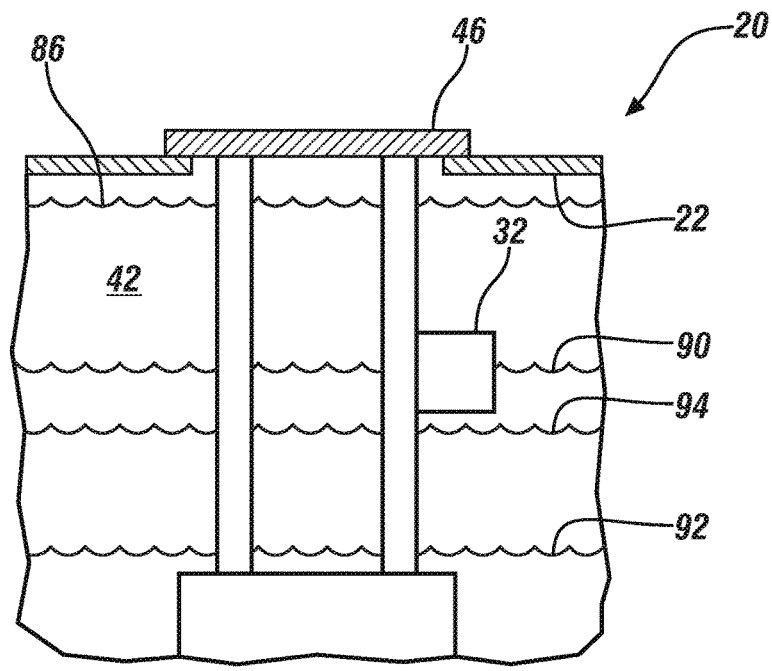
FIG. 3 is a partial enlarged cross section of the fuel storage assembly taken from circle 3 of FIG. 1.

Referring to FIGS. 1 and 3, during normal operation of the fuel storage assembly 20 the primary and secondary fuel tanks 22 may be filled to respective filled levels 86, 88 (i.e., a maximum normal level, see FIG. 1). The fuel transfer shut-off device 32 may be located, at least in-part, below the filled level 86. More specifically, the shut-off device 32 may be mounted at about a shut-off transfer level 90 that may constitute the fuel chamber 42 as being partially full, and thus located below the filled level 86. In one example, the shut-off transfer level 90 may constitute the fuel chamber 42 as being about seventy-five percent (75%) full.

Also during normal operation, and as the primary fuel pump module 26 dispenses fuel to, for example, a combustion engine, the level of the fuel 40 within the primary fuel tank 22 will lower until the level reaches an activate transfer level 92 as measured by the fuel sensor 62 of the primary fuel pump module 26, and monitored by the processor 76 of the controller 38. The activate transfer level 92 may be associated with a transfer threshold value preprogrammed into the electronic storage medium 78 of the controller 38. When the threshold value (i.e., activate transfer level 92) is reached and recognized by the controller 38, the controller 38 may command the secondary fuel pump module 28 to begin transferring fuel from the secondary fuel tank 24 to the primary fuel tank 22. This fuel transfer begins, provided the secondary fuel sensor 64 indicates a sufficient amount of fuel is contained within the secondary fuel chamber 44 as monitored and processed by the controller 38.

During the normal fuel transfer process, the fuel level in the fuel chamber 42 will rise with continued monitoring via the fuel level sensor 62 and the controller 38. When the fuel level rises to a deactivate transfer level 94, the controller 38 may discontinue the fuel transfer by deactivating the secondary fuel pump 60 (i.e., applied during normal operations). The deactivate transfer level 94 may be associated with a deactivate transfer threshold preprogrammed into the controller, and may be located below the shut-off transfer level 90.

During the fuel transfer process, and in a scenario where the fuel level continues to rise past the deactivate transfer level 94, the back-up mode of operation may generally take place. That is, and generally regardless of whether the controller 38 continues to monitor fuel levels and/or remains at least partially operative, when the fuel level reaches the shut-off transfer level 90, the shut-off device 32 is configured to sense the rising liquid fuel 40 at the shut-off transfer level 90 and is adapted, via conductors 66, to effect electrical opening of the relay 34. With the relay 34 open, the fuel pump 60 of the secondary fuel pump module 28 is deprived electrical power and shuts down. Without operation of pump

60, the fuel transfer from the secondary fuel tank 24 to the primary fuel tank 22 terminates and an over-fill condition is prevented.

It is contemplated and understood that the shut-off transfer level 90 may not be below the filled level 86, and may be above the filled level 86. It is further understood that the backup process described may be accomplished independent of the controller 38 and/or any diagnostics or processes executed by the controller. Yet further, the fuel storage assembly 20 may include a warning indicator 96 (see FIG. 1) electrically connected to the relay 34. In operations, when the relay 34 is open, the warning indicator 96 may be initiated to provide a warning (i.e. visual, audible, or both) to a user of, for example, a vehicle. Alternatively, when the relay 34 opens, this event may be acknowledged by the Controller 38 and a CAN signal may be used to activate the warning indicator 96.

Advantages and benefits of the present disclosure include the elimination of additional diagnostics that may be otherwise needed for secondary shut-off sensors. Further benefits include a relatively simple, robust, and inexpensive design.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A fuel storage assembly comprising:
   a power source;
   a first tank;
   a first fuel pump adapted to remove fuel from the first tank;
   an electric relay electrically connected between the power source and the first fuel pump for terminating electric power to the first fuel pump;
   a second tank adapted to receive the fuel removed from the first tank;
   a second fuel pump adapted to remove fuel from the second tank;
   a fuel level sensor configured to measure fuel level within the second tank; and
   a shut-off device located in the second tank and electrically wired to the electric relay and configured to detect a shut-off level of fuel in the second tank, wherein upon detection of the shut-off level the shut-off device effects shut-down of the first fuel pump via the electric relay, wherein the shut-off device effects shut-down of the first fuel pump module upon detection of a deactivate transfer level that is lower than the shut-off level.

2. The fuel storage assembly set forth in claim 1, wherein the shut-off level is lower than a manually filled level.

3. The fuel storage assembly set forth in claim 1, further comprising:
   a controller configured to receive signals from the fuel level sensor, monitor fuel levels in the second tank, and command shut-down of the first fuel pump when the deactivate transfer level is reached.

4. The fuel storage assembly set forth in claim 3, further comprising:
   a warning indicator electrically connected to the controller, and configured to initiate upon detection of the shut-off level.

5. The fuel storage assembly set forth in claim 4, wherein the shut-off level is higher than a manually filled level.

6. The fuel storage assembly set forth in claim 3, wherein the electric relay is normally closed and opened by the shut-off device when the shut-off level is reached.

7. The fuel storage assembly set forth in claim 1, wherein the electric relay is normally closed and opened by the shut-off device when the shut-off level is reached.

8. The fuel storage assembly set forth in claim 1, wherein the shut-off device includes a thermistor for detecting fuel level.

9. The fuel storage assembly set forth in claim 1, wherein the shut-off device includes a reed switch.

10. The fuel storage assembly set forth in claim 1, wherein the shut-off device includes a shield adapted to limit the fuel level sensor from liquid fuel exposure.

11. The fuel storage assembly set forth in claim 10, wherein the shield defines a vapor dome and the fuel level sensor is located in the vapor dome.

12. The fuel storage assembly set forth in claim 11, wherein the shut-off device is disposed below a manually filled level.

13. The fuel storage assembly set forth in claim 1, wherein the shut-off device is attached and supported by the fuel pump module.

14. The fuel storage assembly set forth in claim 1, wherein the fuel storage assembly is a vehicle fuel storage assembly.

15. A vehicle fuel storage assembly comprising:
   a secondary fuel tank;
   a primary fuel tank;
   a secondary fuel pump adapted to pump fuel from the secondary fuel tank to the primary fuel tank;
   a primary fuel pump adapted to expel fuel from the primary fuel tank;
   a primary fuel level sensor adapted to measure fuel level in the primary fuel tank;
   a shut-off fuel level sensor located in the primary fuel tank and adapted to effect shutdown of the secondary fuel pump during an excessive fuel transfer condition;
   a controller configured to receive fuel level signals from the primary fuel level sensor and command activation and deactivation of the secondary fuel pump as dictated by preprogrammed level thresholds; and
   an electric relay in electric communication with the shut-off fuel level sensor, wherein the electric relay is configured to open when the shut-off fuel level sensor detects a shut-off fuel level in the primary fuel tank, and thereby effect shutdown of the secondary fuel pump.

* * * * *